United States Patent
Singh et al.

(10) Patent No.: US 9,942,772 B2
(45) Date of Patent: Apr. 10, 2018

(54) NODE AND METHOD FOR DYNAMIC SYNCHRONIZATION OF COMMUNICATIONS FOR A WIRELESS DEVICE

(71) Applicant: Telefonaktiebolaget L M Ericsson (publ), Stockholm (SE)

(72) Inventors: Damanjit Singh, Huddinge (SE); Tomas Sundin, Sollentuna (SE); Daniel Figueiredo, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 244 days.

(21) Appl. No.: 14/442,985

(22) PCT Filed: Mar. 17, 2015

(86) PCT No.: PCT/SE2015/050312
§ 371 (c)(1),
(2) Date: May 14, 2015

(87) PCT Pub. No.: WO2016/148614
PCT Pub. Date: Sep. 22, 2016

(65) Prior Publication Data
US 2016/0277935 A1    Sep. 22, 2016

(51) Int. Cl.
*H04W 16/14* (2009.01)
*H04W 56/00* (2009.01)
*H04W 36/06* (2009.01)

(52) U.S. Cl.
CPC ......... *H04W 16/14* (2013.01); *H04W 36/06* (2013.01); *H04W 56/00* (2013.01); *H04W 56/0015* (2013.01)

(58) Field of Classification Search
CPC .............................. H04W 84/18; H04W 84/12
See application file for complete search history.

(56) References Cited

U.S. PATENT DOCUMENTS

| | | | |
|---|---|---|---|
| 2010/0238908 A1* | 9/2010 | Wu | H04W 56/0005 370/336 |
| 2011/0200032 A1* | 8/2011 | Lindstrom | H04W 56/0045 370/350 |

(Continued)

FOREIGN PATENT DOCUMENTS

WO    WO 2012/103683 A1    8/2012

OTHER PUBLICATIONS

International Search Report and Written Opinion Corresponding to International Application No. PCT/SE2015/050312; dated Nov. 27, 2014; 14 Pages.
Nokia Corporation et al. "LAA LBT operation using Reservation signals", 3GPP TSG-RAN WG1 Meeting #80, R1-150496; Athens, Greece, Feb. 9-13, 2015, 4 Pages.

(Continued)

*Primary Examiner* — Zhiren Qin
(74) *Attorney, Agent, or Firm* — Sage Patent Group

(57) ABSTRACT

Example embodiments presented herein are directed towards a wireless device and base station, and corresponding method therein, for dynamic synchronization of communications for the wireless device. The wireless device is configured to receive communications on first and second carriers, and wherein the first carrier is configured for synchronous communications and the second carrier is configured for shared communications. The dynamic synchronization is of communications on the second carrier to a predefined frame structure on a first carrier.

34 Claims, 11 Drawing Sheets

(56) References Cited

U.S. PATENT DOCUMENTS

| | | | |
|---|---|---|---|
| 2013/0250925 A1* | 9/2013 | Lohr | H04W 72/0446 370/336 |
| 2015/0023315 A1 | 1/2015 | Yerramalli et al. | |
| 2015/0341877 A1* | 11/2015 | Yi | H04W 56/00 370/350 |
| 2016/0044617 A1* | 2/2016 | Vajapeyam | H04W 56/0005 370/336 |
| 2016/0095110 A1* | 3/2016 | Li | H04W 72/1215 370/329 |
| 2016/0212764 A1* | 7/2016 | Yin | H04W 74/0808 |
| 2017/0048041 A1* | 2/2017 | Yi | H04L 5/0048 |
| 2017/0085346 A1* | 3/2017 | Tiirola | H04W 28/26 |
| 2017/0086213 A1* | 3/2017 | Kalhan | H04W 72/1215 |

OTHER PUBLICATIONS

CMCC "Fractional Subframe Transmission for LBE-based LAA", 3GPP TSG-RAN WG1 #80, R1-150440, Athens, Greece, Feb. 9-13, 2015, 4 Pages.

ETSI, Harmonized European Standard—"Broadband Radio Access Networks (BRAN); 5 GHz high performance RLAN; Harmonized EN covering the essential requirements of article 3.2 of the R&TTE Directive", Draft ETSI EN 301 893 V1.7.2 (Jul. 2014), 95 pp.

IEEE Computer Society, "IEEE Standard for Information Technology—Telecommunications and Information exchange between systems—Local and metropolitan area networks Specific Requirements—Part 11: Wireless LAN Medium Access Control (MAC) and Physical Layer (PHY) specifications: High Speed Physical Layer in the 5 GHz Band", IEEE Standard 802.11™-2012 (Revision of IEEE Std 802.11-207,Mar. 29, 2012, 2793 pp.

\* cited by examiner

NODE AND METHOD FOR DYNAMIC SYNCHRONIZATION OF COMMUNICATIONS FOR A WIRELESS DEVICE

CROSS REFERENCE TO RELATED APPLICATION

This application is a 35 U.S.C. § 371 national stage application of PCT International Application No. PCT/SE2015/050312, filed on 17 Mar. 2015, the disclosure and content of which is incorporated by reference herein in its entirety.

TECHNICAL FIELD

Example embodiments presented herein are directed towards a wireless device and base station, and corresponding method therein, for dynamic synchronization of communications for the wireless device. The wireless device is configured to receive communications on the first and second carriers, and wherein the first carrier is configured for synchronous communications and the second carrier is configured for shared and communications. The dynamic synchronization is of communications on the second carrier to a predefined frame structure on a first carrier.

BACKGROUND

In all regions throughout the world the use of frequency bands for radio transmission are regulated. The regulations consider many aspects such as transmitted output power, spurious emissions, adjacent carrier leakage etc and these requirements vary throughout the different regions and for different frequency bands. One main differentiator for the frequency band regulations is if they are classified as licensed bands or unlicensed bands.

For a licensed frequency band, the band will be separated into one or many carriers and each of these carriers will be associated with one single user. In case of telecommunication this will typically be a Telecom operator. The operator then has full access to the carrier and can transmit continuously on that carrier. Sometimes the license to transmit is also limited to a certain type of wave-form transmission such as e.g. GSM, WCDM or LTE.

For an unlicensed frequency band, on the other hand, anyone can use the different carriers within that band as long as the transmitted waveform is following the regulator limitations. These limitations can describe the output power, the channel occupancy time, the access procedure etc. Examples of such frequency bands are for example the 2.4 Ghz or 5.1 GHz commonly used by different WiFi systems. Normally the transmission on these frequency bands is shared between many technologies and the transmissions are required to be limited in time (non-continuous) to allow others to use the available spectrum.

Comparing WiFi and LTE it is notable the WiFi is well-suited for use on unlicensed carriers whereas LTE is better suited for use on licensed carriers. One main differentiator is that WiFi is an asynchronous access technology since WiFi transmissions can happen at any time if the channel is free. Moreover, the WiFi transmissions have a variable size which is signalled in the preamble of the WiFi data frame. LTE on the other hand is a synchronous access technology where transmissions follow a rigid frame structure and are required to be aligned to the synchronization signals broadcasted in each radio frame. Each scheduled data transmission also has a fixed length of 1 ms which is equal to one LTE subframe.

License-Assisted Access-Long Term Evolution (LAA-LTE) is one of the main work items for the 3GPP LTE Release13 standard. It proposes to use unlicensed bands (e.g. 2.4 GHz and 5.1 GHz) for LTE or LTE-like transmission in coexistence with other wireless standards (like WLAN IEEE 802.11 and Bluetooth). The idea is to have a primary channel on LTE in a licensed band to serve as the main connection while secondary carrier(s) are set up in unlicensed bands to boost the throughput to the user.

Since LAA-LTE has the benefit of always having the possibility to transmit data on the licensed carrier it is considered to be a big advantage to use the licensed carrier for all kinds of control signalling such as grants, acknowledgements/negative-acknowledgments, etc. The unlicensed carrier can be used to off-load the licenses carrier for data whenever it is available. In this way the licensed carrier can be used for robust control signalling and the unlicensed carrier mainly used to boost user data rates in a best-effort fashion.

The main issue with such a solution is the coexistence between many different access technologies since collisions in transmission may significantly reduce performance for all involved access methods and thereby lead to poor spectral efficiency. One of the main goals of the 3GPP work item is to find a solution to handle coexistence with other access technologies such as WiFi and also coexistence between several LTE networks being run by different operators. This leads to the following two main differences of LAA-LTE compared with regular LTE on a licensed carrier:

Since it is not allowed to transmit continuously on the unlicensed carrier and since LTE is synchronous by definition the transmissions on the unlicensed carrier need to be synchronized and aligned to the frame structure on the licensed carrier. This makes it possible for terminals to detect and decode signals on the unlicensed carrier even though transmissions are non-continuous on the unlicensed carrier.

In many cases it is required to listen to the unlicensed carrier first to determine it is available to avoid interrupting ongoing transmissions. This is solved by some carrier sensing functionality that detects the presence of other transmitters on the carrier before starting to transmit. If the carrier is occupied the transmission has to be postponed until the carrier is available.

SUMMARY

In LAA-LTE, the eNB or the UE can transmit only when the channel is free as it is shared by WiFi and other technologies. Since the LAA-LTE carrier needs to be synchronized with the primary carrier it might be almost 1 ms until the next subframe starts and the unlicensed carrier can be used to transmit data. This leads to a waste of resources since the spectrum cannot be used while waiting for the next subframe to start. This disadvantage does not occur in WiFi, which is an asynchronous access method, since the transmission can start directly and there is no waste of spectrum resources.

Following regulators directives, the unlicensed spectrum cannot be utilized in long periods without letting other access points have the chance to transmit. The maximum duration of a LAA-LTE transmission depends on the regional regulatory decisions. In some cases the maximum duration of a transmission is as short as 4 ms and in these cases a loss of up to 1 ms due to the above mentioned synchronization issue is a significant waste of resources. It should be appreciated that the problems discussed above need not be limited to licensed and unlicensed carriers. Such problems generally occur when a wireless device is configured to receive communications on multiple carriers where one carrier is configured for synchronous communications, for example, a licensed carrier, and another carrier is configured for shared communications, for example an unlicensed carrier. For example, a carrier which is shared is a non-dedicated carrier.

Thus, at least one object of the example embodiments presented herein is to provide dynamic synchronization for a wireless device receiving communications on a carrier configured for shared communications. According to the example embodiments, the synchronization on the carrier configured for asynchronous communications is according to a predefined subframe structure of a carrier configured for synchronous communications. Thus, the example embodiments are directed towards defining a timing advance function for the shared carrier, which allows a subframe to start a certain time before the start of the same subframe on the carrier configured for synchronous communications. This allows for an increased efficiency in the usage of the unlicensed resources.

According to some of the example embodiments, the timing advance value can be signalled through the use of a newly defined Timing Advance Preamble (TAP) on the unlicensed spectrum which is then detected and decoded by the UE.

An alternative to this is possible in the case of cross carrier scheduling, when the carrier configured for synchronous communications is an LTE carrier, for example, when the physical downlink control channel (PDCCH) is transmitted over the licensed carrier to schedule the unlicensed carrier. In such situation, the timing advance information can be added to the scheduling information content of the Downlink Control Information (DCI). As soon as the unlicensed transmission burst ends the timing advance value is invalidated and the unlicensed carrier is again considered to be aligned with the licensed carrier until the next timing advance value is detected.

An example advantage of the example embodiments presented herein is the timing advance functionality allows for the start of a subframe on the carrier configured for shared communications as soon as the carrier is available. This method reduces the latency for data transmission and improves the spectral efficiency of, for example, LAA-LTE on the unlicensed carrier.

Accordingly, some of the example embodiments are directed towards a method, in a wireless device, for dynamic synchronization of communications for the wireless device on a second carrier to a predefined frame structure on a first carrier. The wireless device is configured to receive communications on the first and second carriers. The first carrier is configured for synchronous communications and the second carrier is configured for shared communications. The method comprises receiving, from a base station, timing advance related information for communication alignment on the second carrier. The method further comprises determining a timing advance value based on the received timing advance related information. The method also comprises aligning a receipt of the communications on the second carrier to the predefined frame structure of the first carrier with an offset based on the determined timing advance value.

Some of the example embodiments are directed towards a wireless device for dynamic synchronization of communications for the wireless device on a second carrier to a predefined frame structure on a first carrier. The wireless device is configured to receive communications on the first and second carriers. The first carrier is configured for synchronous communications and the second carrier is configured for shared communications. The wireless device comprises a receiving unit configured to receive, from a base station, timing advance related information for communication alignment on the second carrier. The wireless device further comprises a processing unit configured to determine a timing advance value based on the received timing advance related information. The processing unit is further configured to align a receipt of the communications on the second carrier to the predefined frame structure of the first carrier with an offset based on the determined timing advance value.

Some of the example embodiments are directed towards a method, in a base station, for dynamic synchronization of communications for the wireless device on a second carrier to a predefined frame structure on a first carrier. The wireless device is configured to receive communications on the first and second carriers. The first carrier is configured for synchronous communications and the second carrier is configured for shared communications. The method comprises identifying an availability of the second carrier. The method also comprises determining a timing advance value for communication alignment on the second carrier. The method further comprises sending, to the wireless device, timing advance related information. The method further comprises aligning a transmission, to the wireless device, of the communications on the second carrier on the predetermined frame structure of the first carrier with an offset based on the determined timing advance value.

Some of the example embodiments are directed towards a base station for dynamic synchronization of communications for the wireless device on a second carrier to a predefined frame structure on a first carrier. The wireless device is configured to receive communications on the first and second carriers. The first carrier is configured for synchronous communications and the second carrier is configured for shared communications. The base station comprises a processing unit configured to identify an availability of the second carrier. The processing unit is further configured to determine a timing advance value for communication alignment on the second carrier. The base station further comprises a transmitting unit configured to transmit, to the wireless device, timing advance related information. The processing unit is further configured to align a transmission, to the wireless device, of the communications on the second carrier on the predetermined frame structure of the first carrier with an offset based on the determined timing advance value.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
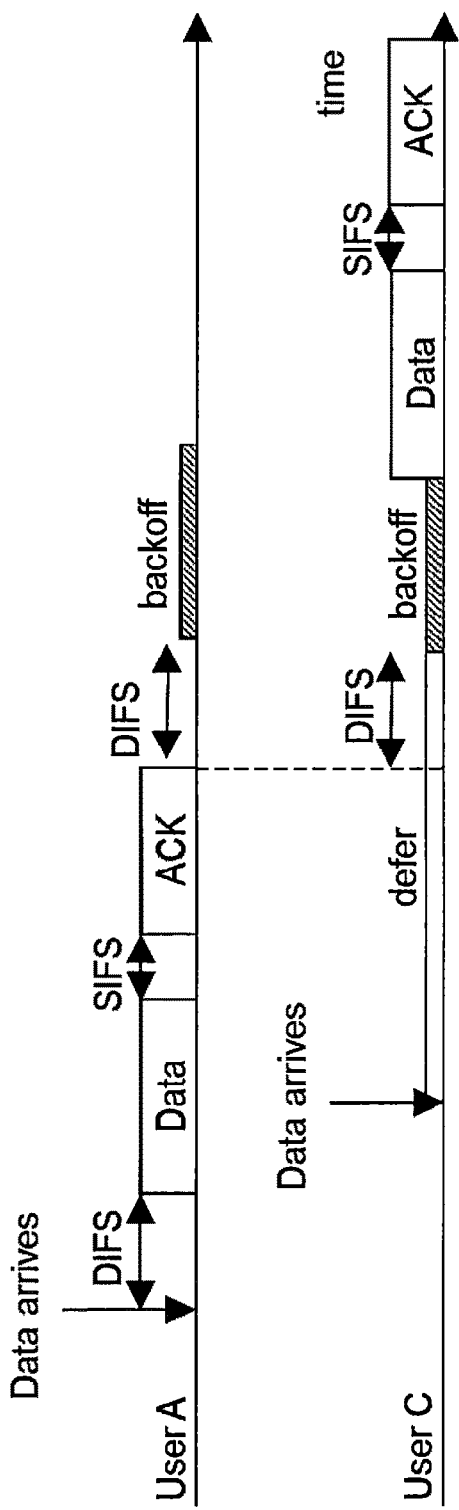
FIG. 1 is an illustrative example of a Distributed Coordination Function (DCF)

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

It should be appreciated that the terms wireless device and user equipment (UE) may be used interchangeably. It should also be appreciated that the terms base station and eNodeB (eNB) may be used interchangeably. It should be appreciated that all example embodiments described herein may be utilized independently or in any combination with other example embodiments.

Example embodiments presented herein are directed towards a wireless device and base station, and corresponding method therein, for dynamic synchronization of communications for the wireless device. The wireless device is configured to receive communications on the first and second carriers, and wherein the first carrier is configured for synchronous communications and the second carrier is configured for shared communications. Specifically, the second carrier is not a dedicated carrier. Thus, the second carrier may be used by other devices and for various radio access technologies. The first carrier utilizes time alignment of all communications according to a synchronization signal.

The dynamic synchronization is of communications on the second carrier to a predefined frame structure on a first carrier. It should further be appreciated that the example embodiments are described herein using LTE-LAA as an example. It should be appreciated that the example embodiments need not be limited to LTE-LAA but may be applied to synchronous communications between two carriers where one carrier is configured to synchronous communications and the other carrier is configured to shared communications.

In order to provide a better explanation of the example embodiments, a problem will first be identified and discussed. In LAA-LTE, the eNB or the UE can transmit only when the channel is free as it is shared by WiFi and other technologies. Since the LAA-LTE carrier needs to be synchronized with the primary carrier it might be almost 1 ms until the next subframe starts and the unlicensed carrier can be used to transmit data. This leads to a waste of resources since the spectrum cannot be used while waiting for the next subframe to start. This disadvantage does not occur in WiFi, which is shared access method, since the transmission can start directly and there is no waste of spectrum resources.

Following regulators directives, the unlicensed spectrum cannot be utilized in long periods without letting other access points have the chance to transmit. The maximum duration of a LAA-LTE transmission depends on the regional regulatory decisions. In some cases the maximum duration of a transmission is as short as 4 ms and in these cases a loss of up to 1 ms due to the above mentioned synchronization issue is a significant waste of resources. It should be appreciated that the problems discussed above need not be limited to licensed and unlicensed carriers. Such problems generally occur when a wireless device is configured to receive communications on multiple carriers where one carrier is configured for synchronous communications, for example, a licensed carrier, and another carrier is configured for shared communications, for example an unlicensed carrier.

Thus, at least one object of the example embodiments presented herein is to provide dynamic synchronization for a wireless device receiving communications on a carrier configured for shared communications. According to the example embodiments, the synchronization on the carrier configured for shared communications is according to a predefined frame structure of a carrier configured for synchronous communications. Thus, the example embodiments are directed towards defining a timing advance function for the shared carrier, which allows a subframe to start a certain time before the start of the same subframe on the carrier configured for synchronous communications. This allows for an increased efficiency in the usage of the unlicensed resources.

To be able to utilize the unlicensed carrier, or the carrier configured for shared communication, for transmission, carrier must be available or free. Therefore, a channel sensing algorithm may be implemented. As soon as the channel is available, it may be reserved by starting to transmit some signal energy that prevents others from claiming the channel. When running LTE on the unlicensed carrier, such signal differs from WiFi signals. LTE signal consists of the regular common reference signals (CRS) which are located in predefined time and frequency locations given by the timing reference from the licensed carrier. The CRS are the basis of a number of measurements and are also suitable for detection of a LTE carrier on the unlicensed spectrum. The remainder of the resource elements should be filled with dummy data to get a sufficient output power level reducing the risk of a competing technology, such as WiFi or neighbour LAA-LTE, trying to claim the channel. The transmission of the CRS and dummy data needs to be continued until the next start of a complete subframe on the primary unlicensed carrier. It is then that the scheduling and transmission of user data can then start.

Note that the length of the transmission of CRS and dummy data can be quite long if the channel is detected as available just after the start of a subframe on the licensed carrier. On average the wasted spectrum resources amount to around 0.5 ms which could be a significant loss.

Figure 2:
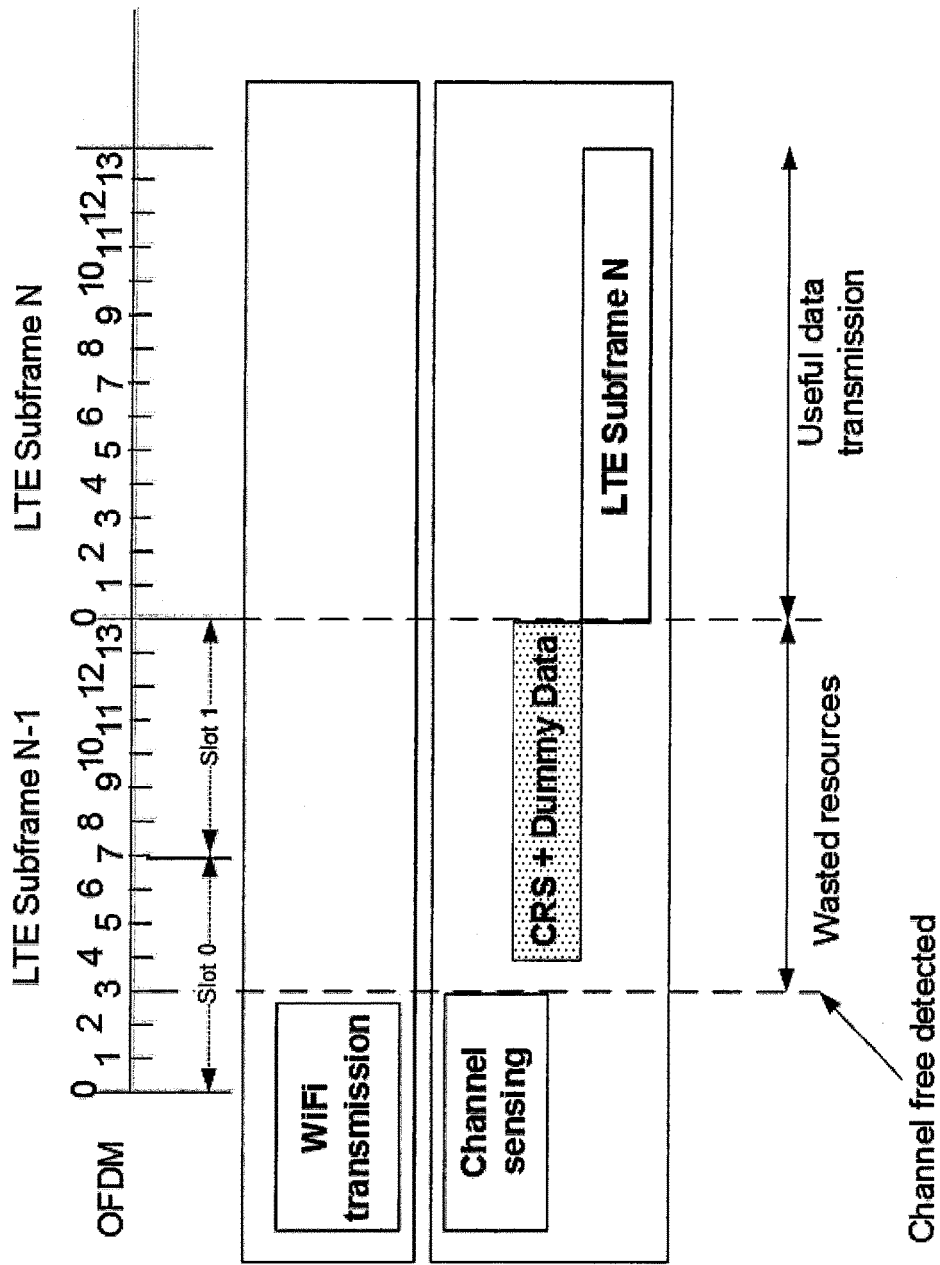
FIGS. 2-5 are illustrations of timing scheduling with the use of timing advance in a carrier configured for shared communications, according to some of the example embodiments.

This scenario is depicted in FIG. 2 where on top the time synchronization obtained from the licensed LTE carrier is indicated. FIG. 2 illustrates a first carrier configured for synchronous communications. In the example of FIG. 2, the first carrier is a LTE licensed carrier. FIG. 2 further illustrates a second carrier configured for shared communications. In the example of FIG. 2, the second carrier is an unlicensed WiFi carrier. Above the first and second carriers, an LTE subframe is provided. This is a predefined subframe on the first carrier. It should be appreciated that the subframe comprises two predefined slots labelled Slot 0 and Slot 1. The subframe also comprises 14 OFDM symbols labelled OFDM=0 to OFDM=13.

As soon as the WiFi AP transmission is ended the LTE AP can detect that the channel is free through its channel sensing algorithm and start transmitting CRS+dummy data to claim the channel, this is labelled as CRS+DUMMY DATA in FIG. 2. This is done until the next subframe starts in the first carrier and the LTE AP can schedule data also on the second carrier. The amount of wasted resources depends on when the WiFi AP ends its transmission in relation to the timing synchronization of the second carrier.

Thus, as illustrated in FIG. 2, communications are aligned such that the communications begin at a start of a next subframe of the predefined subframe of the carrier configured for synchronous communications.

According to some of the example embodiments, alignment may be provided with the use of a timing advance. According to some of the example embodiments, the timing advance may be configured such that the timing advance is associated with an offset according to a predetermined slot, symbol, a basic time unit or an absolute time. It should be appreciated that various standards may have defined basic time units. For example, in 3GPP LTE the basic time unit=1/30720000 s.

Figure 3:
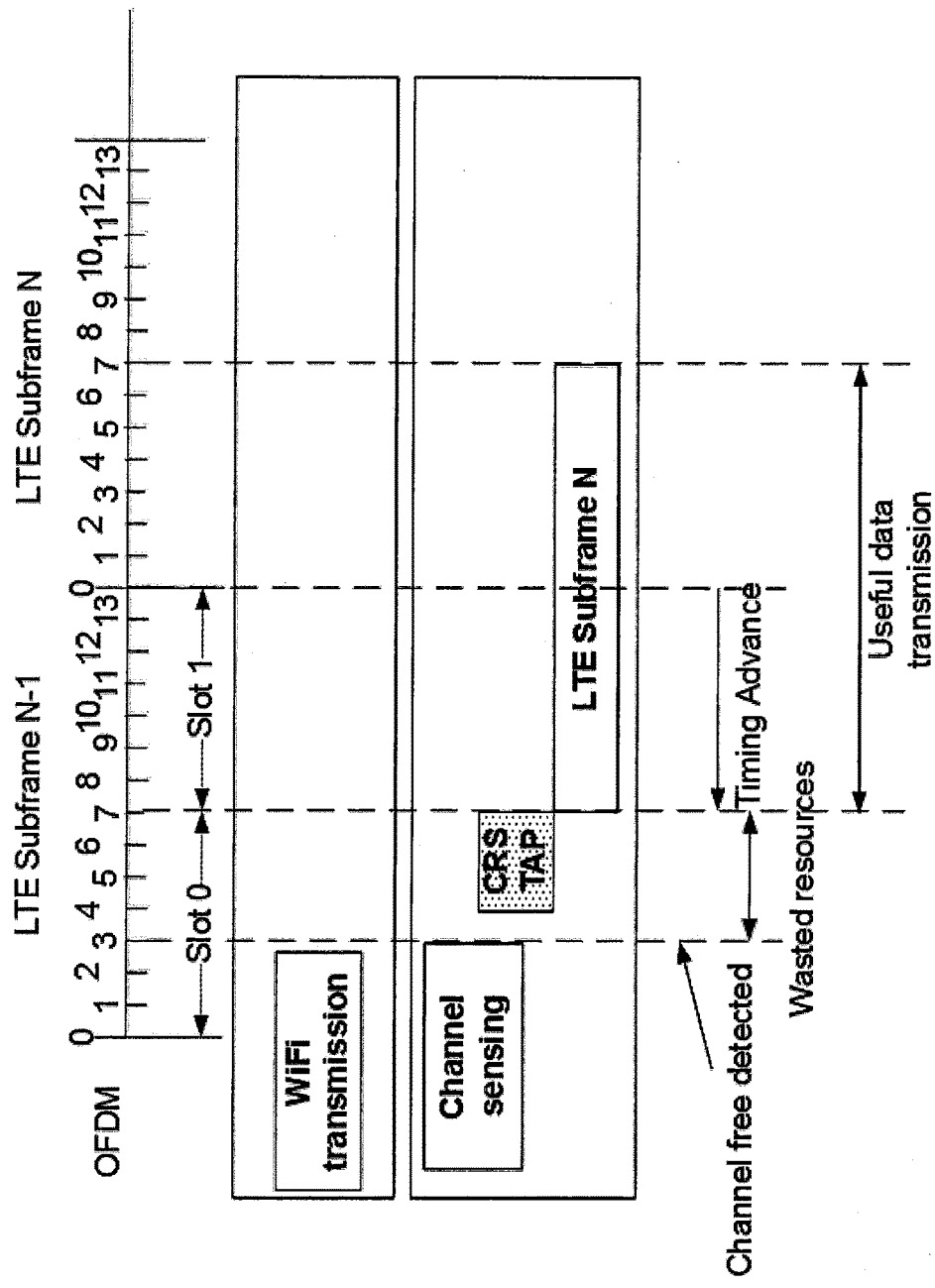

FIG. 3 illustrates an example embodiment where the timing advance is configured such that the timing advance is associated with an offset according to a predetermined slot. The carriers and subframes of FIG. 3 are the same as those explained in FIG. 2. In the example provided in FIG. 3, the second carrier is detected as being free during the subframe labelled LTE subframe N−1, within Slot 0 and at OFDM symbol 3. Upon the detection of the second carrier being free, the CRS TAP data is sent.

In FIG. 3, the transmission of the synchronous communications takes place within the subframe N−1 and at the start of Slot 1. Thus, the timing advance of FIG. 3 is associated with an offset according to a predetermined slot. The timing advance of FIG. 3 has at least two example advantages.

The first is that the preamble only needs to contain one information bit and it is therefore quite easy to design such a sequence, which has high reliability and is easy to decode. The second advantage is that the symbol timing and CRS positions between the licensed carrier and the unlicensed are kept the same and therefore the implementation is simple in the UE and it is also quite robust against miss-detection of the TAP. One drawback may be that it will still be up to 0.5 ms of dummy data transmitted, 0.25 on average.

Figure 4:
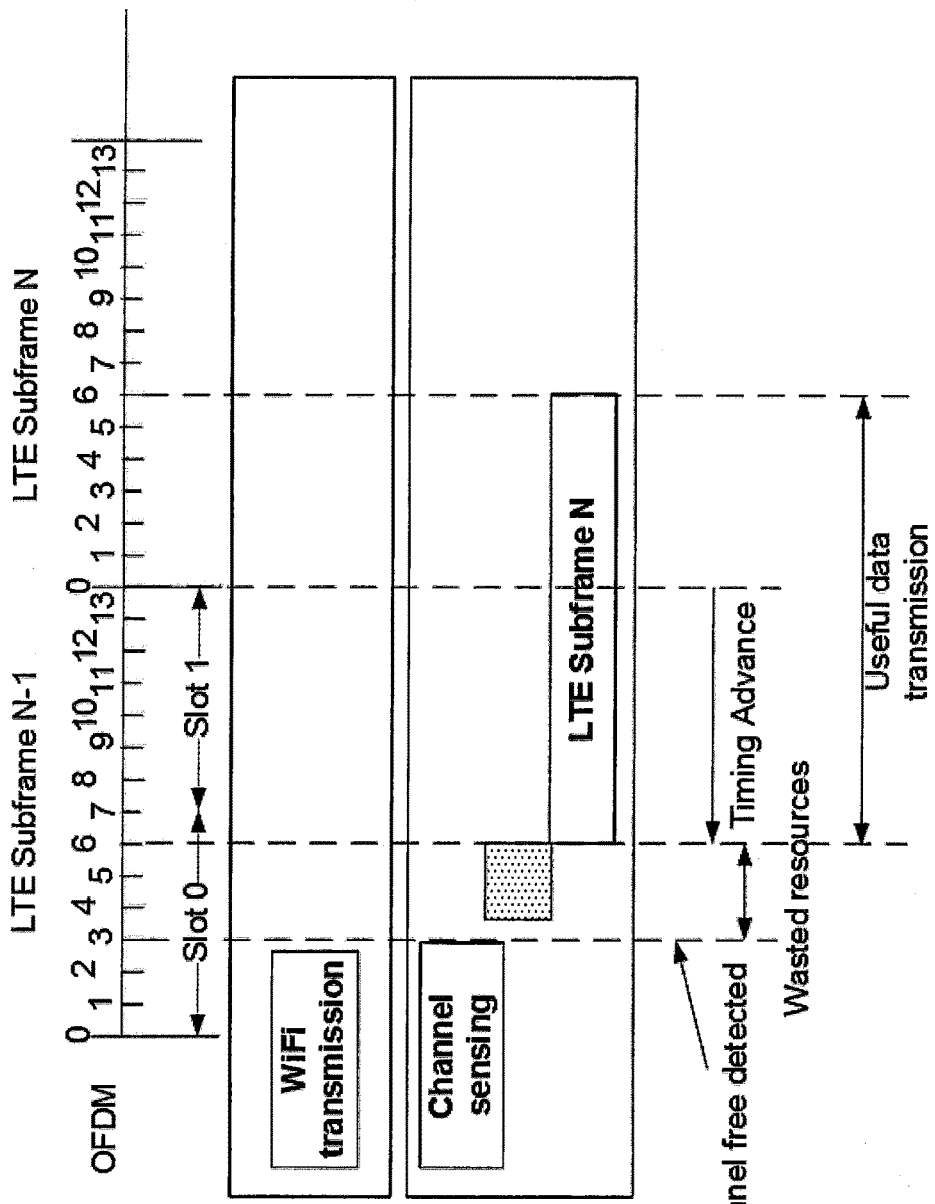

FIG. 4 illustrates another example embodiment where the timing advance is configured such that the timing advance is associated with an offset according to a predetermined LTE symbol. The carriers and subframes of FIG. 4 are the same as those explained in FIG. 3. In the example provided in FIG. 4, the second carrier is detected as being free during the subframe labelled LTE subframe N−1, within Slot 0 and at OFDM symbol 3. Upon the detection of the second carrier being free, the CRS TAP data is sent.

In FIG. 4, the transmission of the synchronous communications takes place within the subframe N−1 and within Slot 0. Specifically, the synchronous communication is advanced to OFDM symbol 6. Thus, the timing advance of FIG. 4 is associated with an offset according to at least one predetermined symbol. The timing advance embodiment of FIG. 4 comprises a higher degree of resolution than the timing advance embodiment of FIG. 3. Specifically, in the embodiment of FIG. 4, the timing advance value may be associated with any of the symbols 0-13.

The timing advance of FIG. 4 has the advantages of only needing a limited set of preambles to be able to decode integers between 0 and 13 and also keeping the symbol timing reasonable well aligned between the first and the second carriers, the cyclic prefix has different lengths for different symbols and therefore the timing is not perfectly aligned in all cases but the difference is so small that it will not have any practical impact, and thereby the UE does not need to move the receiver FFT window after detection of the TAP. The duration of the dummy data transmission before the useful transmission starts can in this case be kept smaller than one symbol (<72 us).

Figure 5:
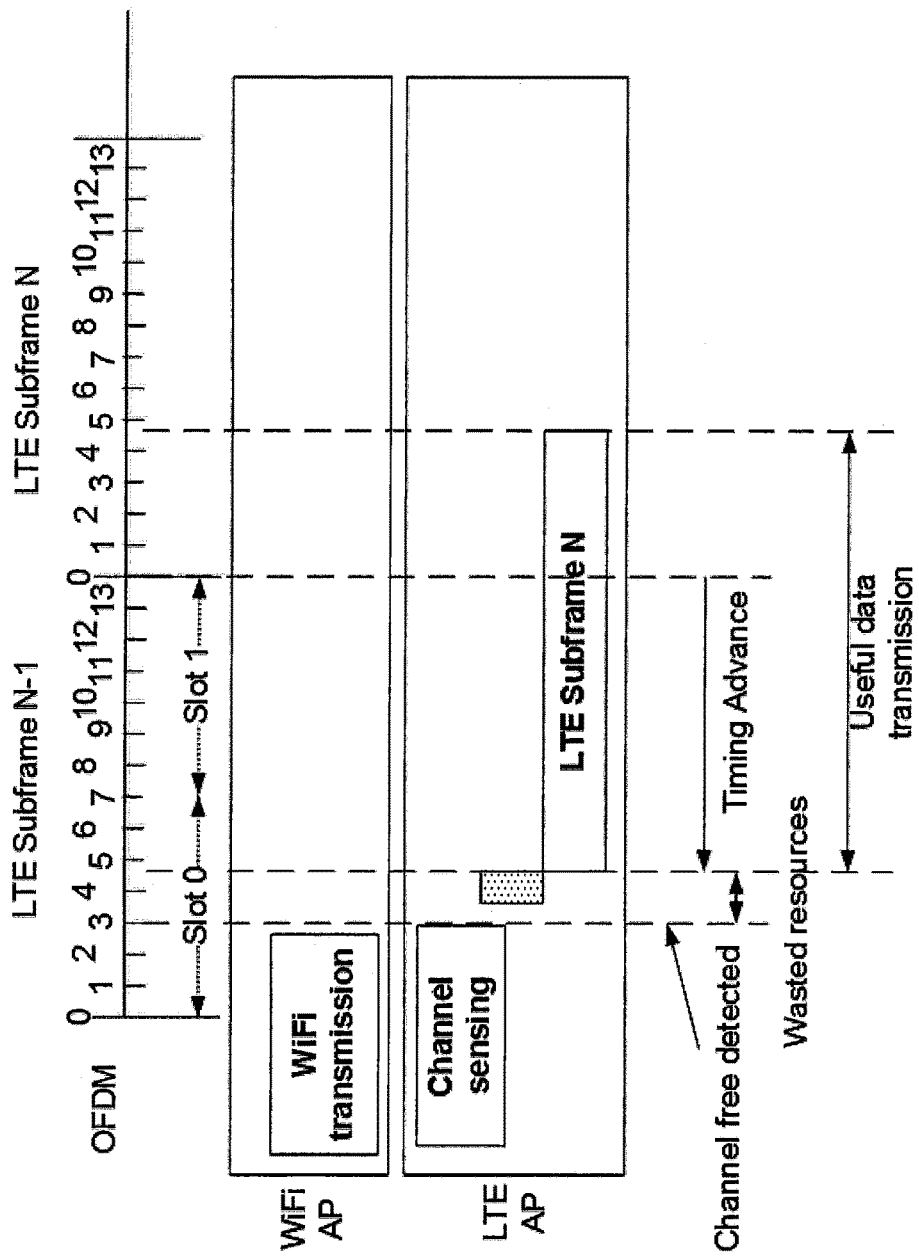

FIG. 5 illustrates another example embodiment where the timing advance is configured such that the timing advance is associated with an offset according to an absolute time or in basic LTE time units. The carriers and subframes of FIG. 5 are the same as those explained in FIGS. 3-4. In the example provided in FIG. 5, the second carrier is detected as being free during the subframe labelled LTE subframe N−1, within Slot 0 and at OFDM symbol 3. Upon the detection of the second carrier being free, the CRS TAP data is sent.

In FIG. 5, the transmission of the synchronous communications takes place within the subframe N−1 and within OFDM symbol 4. Specifically, the synchronous communication is advanced within OFDM symbol 4 or according to an absolute time not aligned with the start of a subframe, slot or symbol. Thus, the timing advance of FIG. 5 is associated with an offset according to an absolute time or in basic LTE time units. The timing advance embodiment of FIG. 5 comprises a higher degree of resolution than the timing advance embodiments of FIGS. 3-4.

An example advantage of the timing advance of FIG. 5 is the ability to minimize the transmission of dummy data. The drawback of this is that the TAP detection must contain more information bits to specify the exact timing advance value, for example, in micro seconds or in basic LTE time unit resolution, and thereby more sequences are needed and potentially the detection is more computationally complex. Another drawback is that the OFDM symbol position will not necessarily be the same between the first carrier and the second carrier and that might lead to a difficult implementation in the UE when the receiver FFT window needs to be shifted after detection of the TAP.

According to some of the example embodiments, the length of the TAP should be kept short to optimize spectrum utilization. According to some of the example embodiments, a possible TAP value is one OFDM symbol. Depending on the choice of timing advance resolution the preamble sequence may need to carry different amount of information bits and a suitable preamble selection will have to be based on that. Other things to consider are robustness and computational complexity for the UE. To minimize the implementation effort it might even be possible to reuse some sequences already used in LTE today for other purposes such as for example synchronization signals, reference signals or scrambling sequences. The choice of preamble is not considered in more detail in this invention disclosure.

According to some of the example embodiments, the LTE burst may need to be limited in time to allow for other APs and other access technologies to use the unlicensed spectrum. It is therefore necessary to stop the LTE transmission after a certain time or as soon as there is nothing more to transmit. The end of the burst is easily detected by UEs trying to do signal strength measurements on the CRS. As soon as the burst is detected to have ended the assumed timing advance value is set to zero and the UE restarts its detection of the CRS and the TAP under that assumption until the next TAP is decoded.

According to some of the example embodiments, if the system is set up to send scheduling information on the licensed carrier also for scheduling the unlicensed carrier, for example, cross carrier scheduling, it is possible to include the timing advance value in the downlink control information (DCI) message directly transmitted on the licensed carrier instead of using a TAP. Apart from that the use of the timing advance, it has the same functionality as described above.

Example Node Configurations

Figure 6:
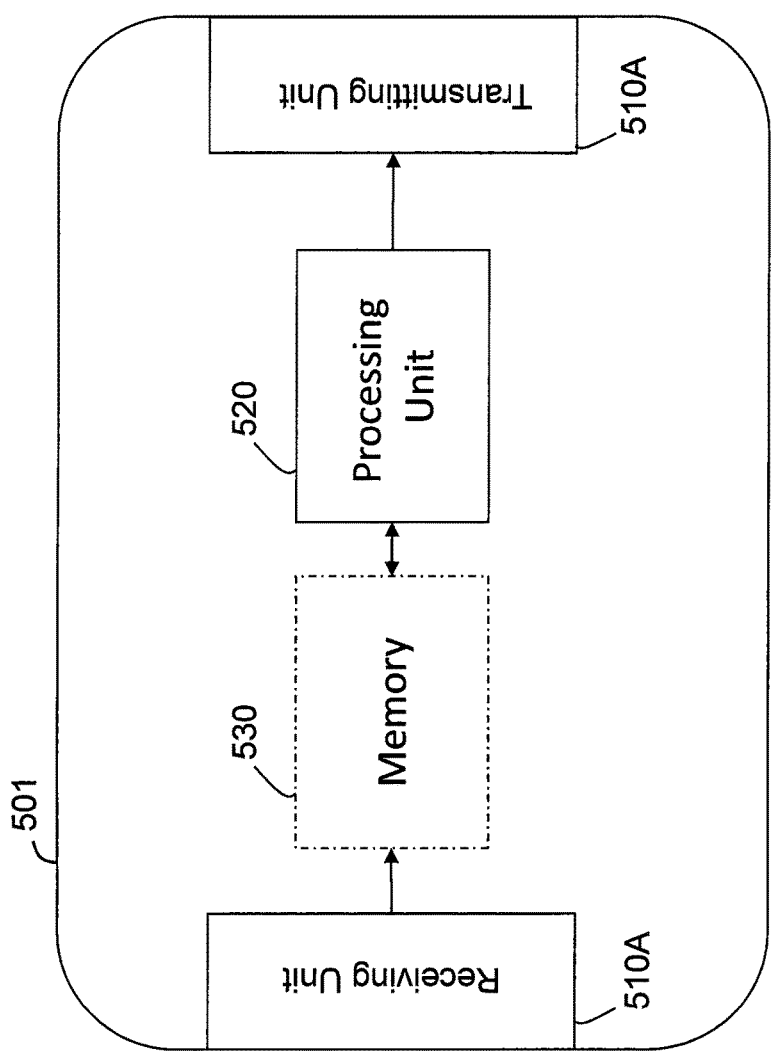
FIG. 6 is an illustration of an example node configuration of a wireless device, according to some of the example embodiments presented herein.

FIG. 6 illustrates an example of a user equipment/wireless device which may incorporate some of the example embodiments discussed above. As shown in FIG. 6, the wireless device 501 may comprise a receiving unit 510A and transmitting unit 510B configured to receive and transmit, respectively, any form of communications or control signals within a network. It should be appreciated that the receiving unit 510A and transmitting unit 510B may be comprised as any number of transceiving, receiving, and/or transmitting units, modules, or circuitry. It should further be appreciated that the receiving unit 510A and transmitting unit 510B may be in the form of any input/output communications port known in the art. The receiving unit 510A and transmitting unit 510B may comprise RF circuitry and baseband processing circuitry (not shown).

The wireless device 501 may further comprise at least one memory unit or circuitry 530 that may be in communication with the receiving unit 510A and transmitting unit 510B. The memory 530 may be configured to store received or transmitted data and/or executable program instructions. The memory 530 may be any suitable type of computer readable memory and may be of volatile and/or non-volatile type.

The wireless device 501 may further comprise further processing unit 520 which may be configured to provide alignment as described herein. The processing unit 520 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 7:
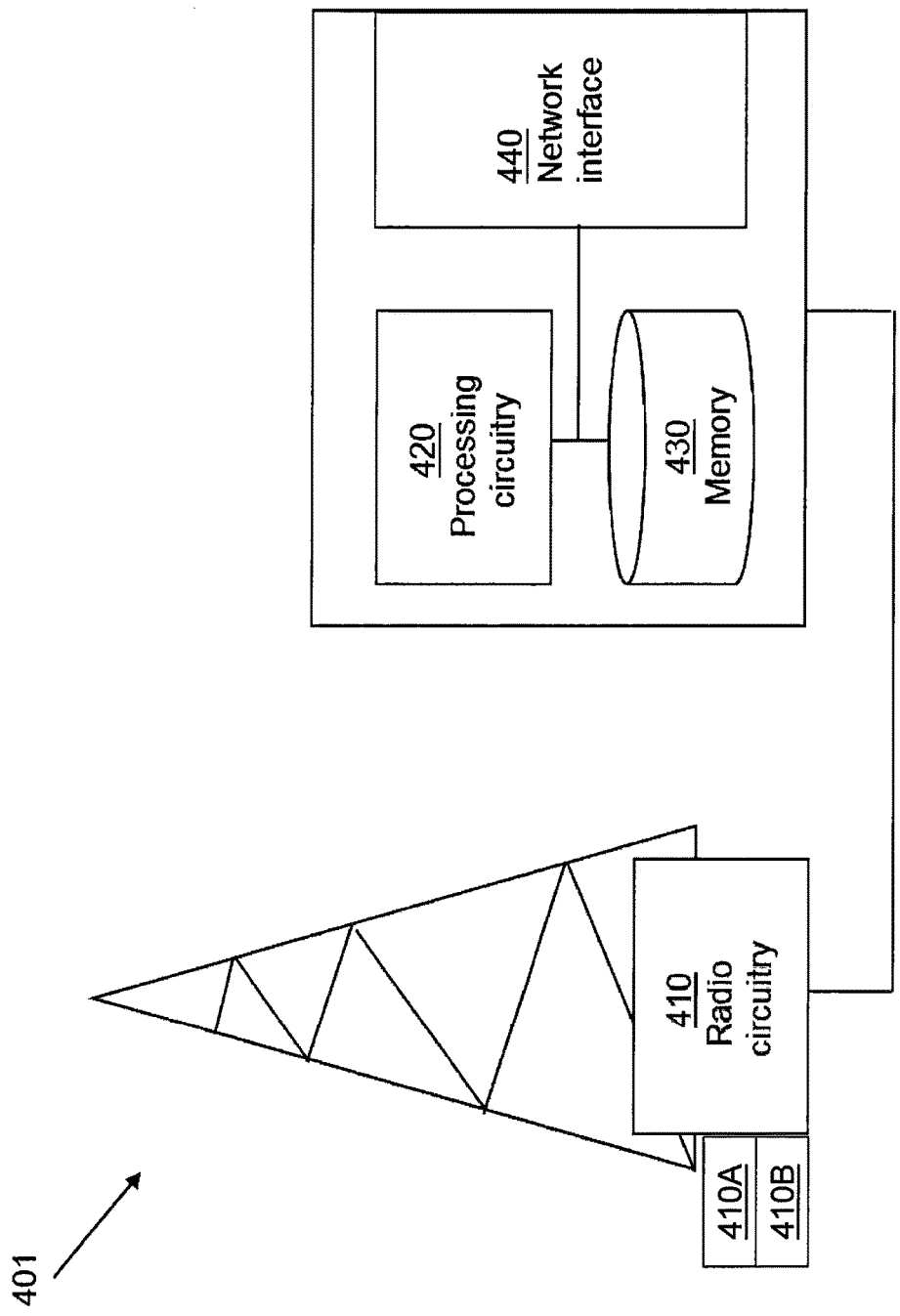
FIG. 7 is an illustration of an example node configuration of a base station, according to some of the example embodiments presented herein.

FIG. 7 illustrates an example of a base station 401 which may incorporate some of the example embodiments discussed above. As shown in FIG. 7, the base station 401 may comprise a receiving unit 410A and transmitting unit 410B configured to receive and transmit, respectively, any form of communications or control signals within a network. It should be appreciated that the receiving unit 410A and transmitting unit 410B may be comprised as any number of transceiving, receiving, and/or transmitting units, modules or circuitry. It should further be appreciated that the receiving unit 410A and transmitting unit 410B may be in the form of any input/output communications port known in the art. The receiving unit 410A and transmitting unit 410B may comprise RF circuitry 410 and baseband processing circuitry (not shown).

The base station 401 may further comprise at least one memory unit or circuitry 430 that may be in communication with the receiving unit 410A and transmitting unit 410B. The memory 430 may be configured to store received or transmitted data and/or executable program instructions. The memory 430 may be any suitable type of computer readable memory and may be of volatile and/or non-volatile type.

The base station 401 may further comprise a network interface 440 and processing unit 420 which may be configured to provide alignment as described herein. The processing unit 420 may also be configured to provide configuration instructions to the user equipment or wireless device. The processing unit 420 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Example Node Operations

Figure 8A:
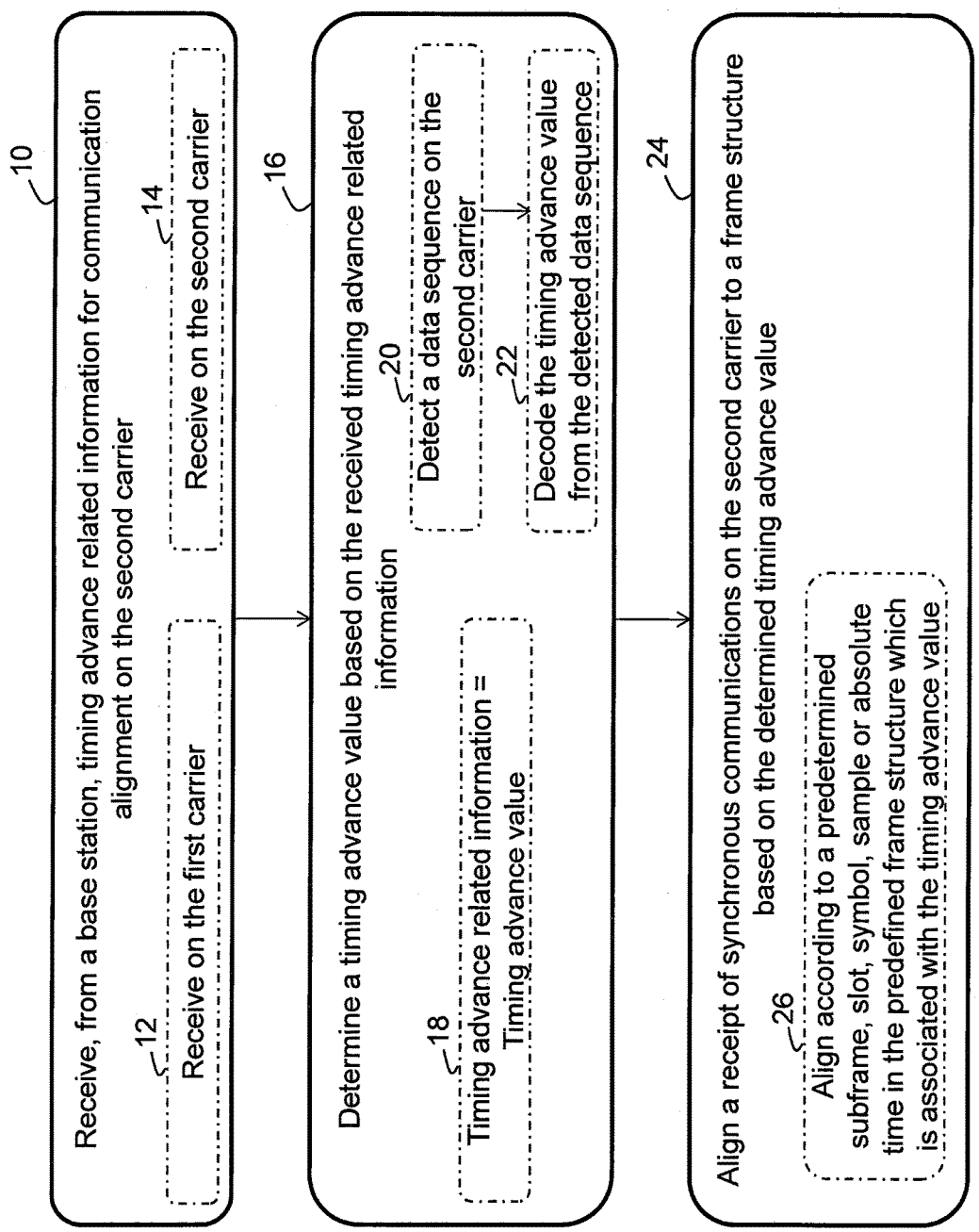
FIG. 8A is a flow diagram of example operations which may be taken by the wireless device of FIG. 6, according to some of the example embodiments.

FIG. 8A is a flow diagram depicting example operations which may be taken by the wireless device for dynamic synchronization of communications for the wireless device on a second carrier to a predefined frame structure on a first carrier, as described herein. The wireless device is configured to receive communications on the first and second carriers. The first carrier is configured for synchronous communications and the second carrier is configured to shared and non-continuous communications. According to some of the example embodiments, the communications are LTE or WCDMA based communications. According to some of the example embodiments, the predefined frame structure is an OFDM frame structure of a CDMA frame structure.

It should also be appreciated that FIG. 8A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 8B:
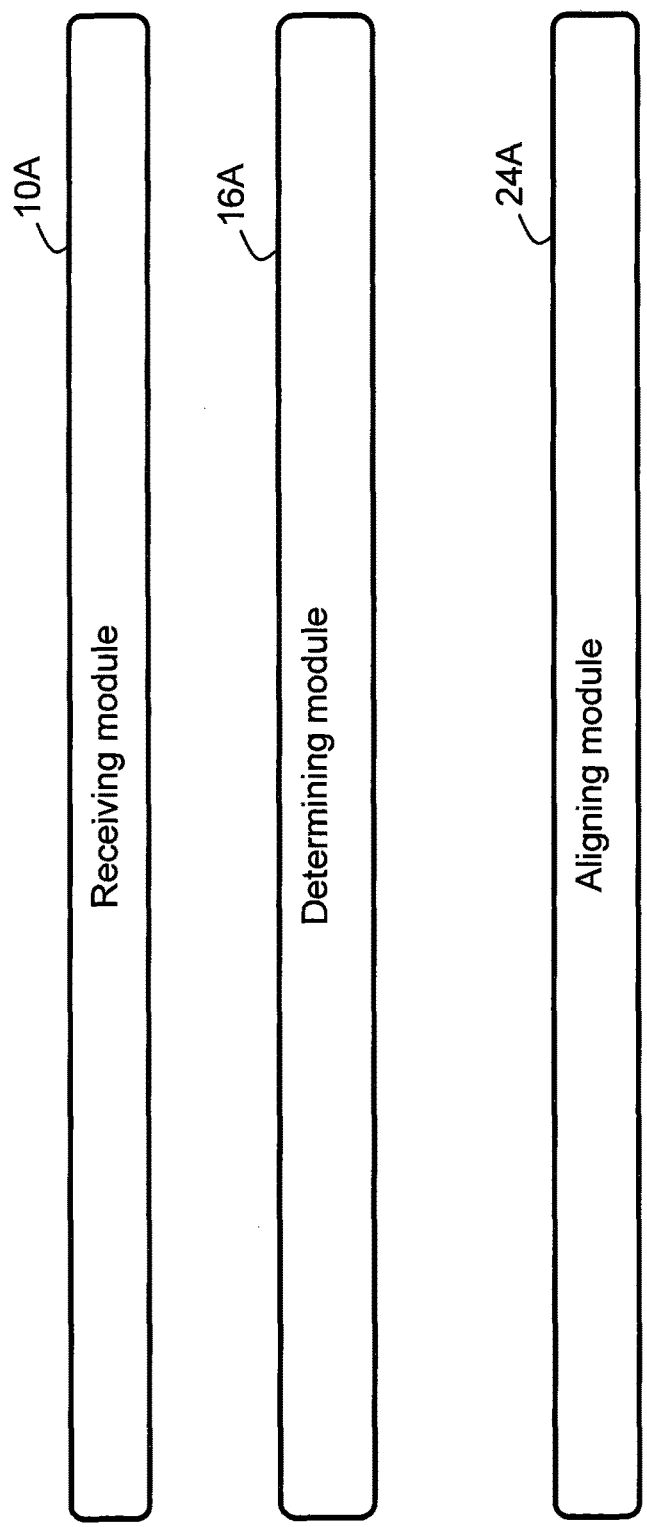
FIG. 8B is an illustration of modules which may perform at least some of the operations of FIG. 8A, according to some of the example embodiments.

FIG. 8B is a module diagram describing modules of the wireless device according to some of the example embodiments herein.

Operation 10

The wireless device 501 is configured to receive 10, from a base station 401, timing advance related information for communication alignment on the second carrier. The receiving unit 510A is configured to receive, from the base station, the timing advance related information for communication alignment on the second carrier. The receiving module 10A is configured to perform operation 10.

According to some of the example embodiments, the timing advance related information may be a value of the timing advance. According to some of the example embodiments, the timing advance related information may be an indication as to how or where to obtain the timing advance value. For example, the timing advance related information may provide an indication to the wireless device to receive the timing advance information on the second carrier.

Example Operation 12

According to some of the example embodiments, the receiving 10 further comprises receiving 12 the timing advance related information on the first carrier. The receiving unit 510A is configured to receive the timing advance related information on the first carrier.

According to such example embodiments, the timing advance related information may be a value of the timing advance. According to some of the example embodiments, the timing advance related information may be an indication as to how or where to obtain the timing advance value. For example, the timing advance related information received on the first carrier may provide an indication to the wireless device to obtain the timing advance information on the second carrier.

Operation 14

According to some of the example embodiments, the receiving 10 further comprises receiving 14 the timing advance related information on the second carrier. The receiving unit 510A is configured to receive the timing advance related information on the second carrier.

Operation 16

The wireless device 501 is also configured to determine 16 a timing advance value based on the received timing advance related information. The processing unit 520 is configured to determine the timing advance value based on the received timing advance related information. The determining module 16A is configured to perform operation 16.

Example Operation 18

According to some of the example embodiments, the determining 16 is further comprises determining 18 the timing advance related information is the timing advance value. The processing unit 520 is configured to determine the timing advance related information is the timing advance value.

According to such example embodiments, the timing advance value is sent on the first carrier. For example, in the case of LTE based communications, the timing advance value may be received via the PDCCH.

Example Operation 20

According to some of the example embodiments, the determining 16 further comprises detecting a data sequence on the second carrier. The processing unit 520 is configured to detect the data sequence on the second carrier.

According to such example embodiments, the timing advance value is in the form of encoded data provided in the data sequence. According to such example embodiments, the timing advance related information may be received on the first carrier. In such an embodiment, the timing advance related information may be an indication to obtain the timing advance value on the second carrier. According to some of the example embodiments, the wireless device may be configured to search for the timing advance value on the second carrier upon receiving an indication that the second carrier is available.

Example Operation 22

According to some of the example embodiments, the determining 16 and the detecting 20 may further comprise decoding 22 the timing advance value from the detected data sequence. The processing unit 520 is configured to decode the timing advance value from the detected data sequence.

Operation 24

The wireless device is further configured to align 24 a receipt of the communications on the second carrier to the predefined frame structure of the first carrier with an offset based on the determined timing advance value. The processing unit 520 is configured to align the receipt of the communications on the second carrier to the predefined frame structure of the first carrier with an offset based on the determined timing advance value. The aligning module 24A is configured to perform operation 24. Examples of such alignment is explained in relation to at least FIGS. 3-5.

Example Operation 26

According to some of the example embodiments, the aligning 24 further comprises aligning 26 the receipt of communications to the predefined frame structure of the first carrier with the offset according to a predetermined slot, symbol, basic time unit or absolute time which is associated with the determined timing advance value. The processing unit 520 is configured to align the receipt of communications to the predefined frame structure of the first carrier with the offset according to the predetermined slot, symbol, basic time unit or absolute time which is associated with the determined timing advance value.

An example of an offset according to a predetermined slot is provided in FIG. 3. An example of an offset according to a predetermined symbol is provided in FIG. 4. An example of an offset according to a predetermined absolute time is provided in FIG. 5.

Figure 9A:
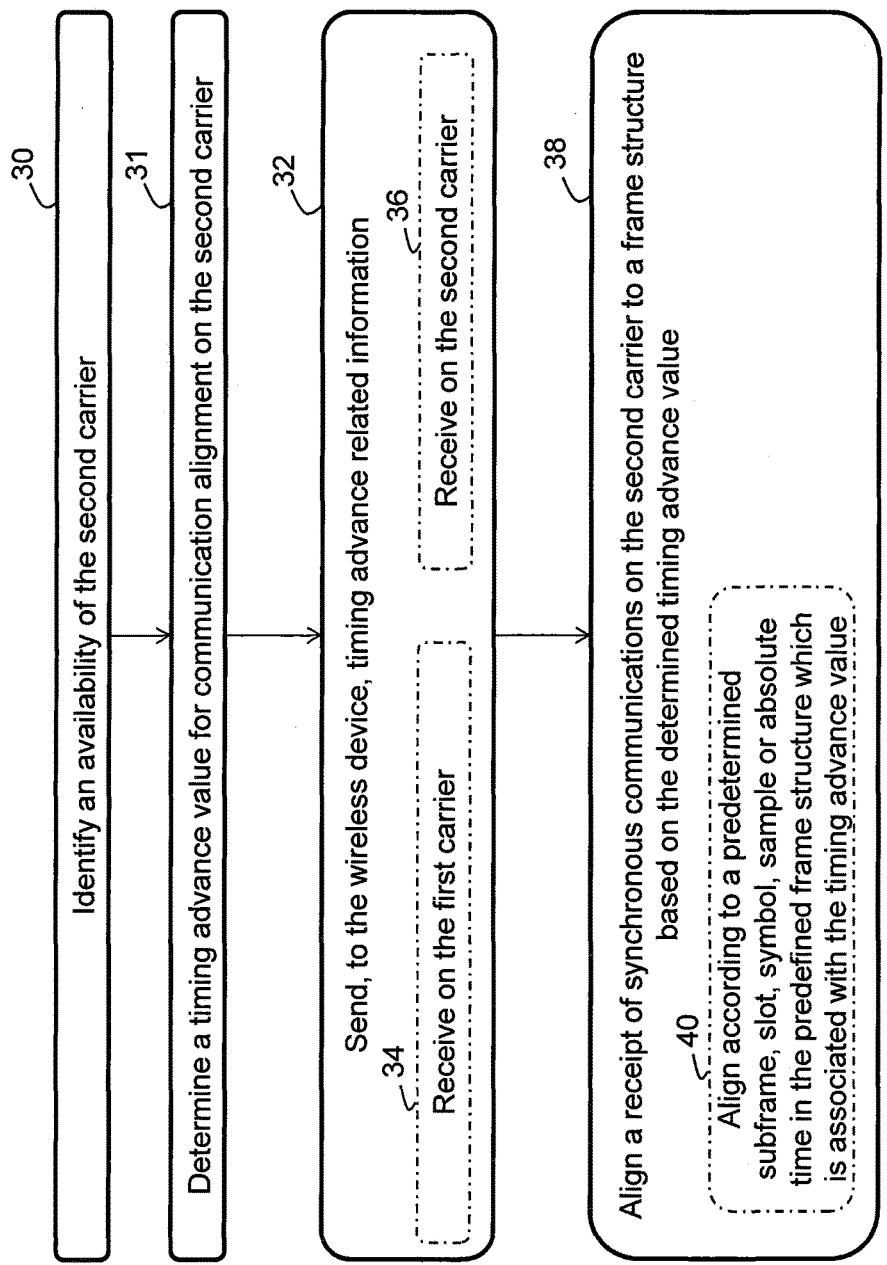
FIG. 9A is a flow diagram of example operations which may be taken by the base station of FIG. 7, according to some of the example embodiments.

FIG. 9A is a flow diagram depicting example operations which may be taken by the base station for dynamic synchronization of communications for the wireless device on a second carrier to a predefined frame structure on a first carrier, as described herein. The wireless device is configured to receive communications on the first and second carriers. The first carrier is configured for synchronous communications and the second carrier is configured to shared and non-continuous communications. According to some of the example embodiments, the communications are LTE or WCDMA based communications. According to some of the example embodiments, the predefined frame structure is an OFDM frame structure of a CDMA frame structure.

It should also be appreciated that FIG. 9A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 9B:
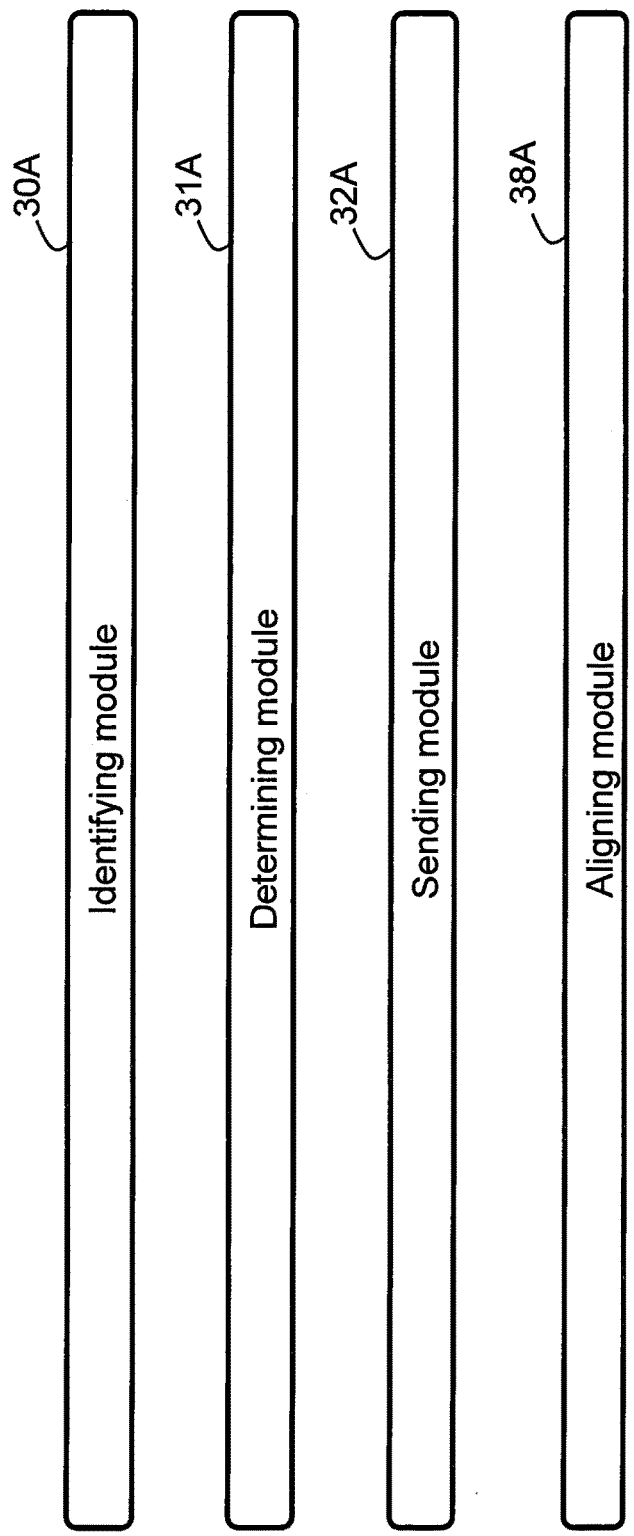
FIG. 9B is an illustration of modules which may perform at least some of the operations of FIG. 9A, according to some of the example embodiments.

FIG. 9B is a module diagram describing modules of base station according to some of the example embodiments herein.

Operation 30

The base station is configured to identify 30 an availability of the second carrier. The processing unit 420 is configured to identify the availability of the second carrier. The identifying module 30A is configured to perform operation 30. According to some of the example embodiments, the identification may be performed via a channel sensing technique, as described herein.

Operation 31

The base station is further configured to determine 31 a timing advance value for communication alignment on the second carrier. The processing unit 420 is configured to determine the timing advance value for communication alignment on the second carrier. The determining module 31A is configured to perform operation 31.

Operation 32

The base station is also configured to send 32, to the wireless device, timing advance related information. The transmitting unit 410B is configured to send, to the wireless device, the timing advance related information. The receiving module 32A is configured to perform operation 32.

According to some of the example embodiments, the timing advance related information may be a value of the timing advance. According to some of the example embodiments, the timing advance related information may be an indication as to how or where to obtain the timing advance value. For example, the timing advance related information may provide an indication to the wireless device to receive the timing advance information on the second carrier.

Example Operation 34

According to some of the example embodiments, the sending 32 further comprises sending 34 the timing advance related information on the first carrier. The transmitting unit 410B is configured to send the timing advance value on the first carrier.

According to such example embodiments, the timing advance related information may be a value of the timing advance. According to some of the example embodiments, the timing advance related information may be an indication as to how or where to obtain the timing advance value. For example, the timing advance related information received on the first carrier may provide an indication to the wireless device to obtain the timing advance information on the second carrier.

Example Operation 36

According to some of the example embodiments, the sending 32 further comprises sending 36 the timing advance related information on the second carrier. The transmitting unit 410B is configured to send the timing advance related information on the second carrier.

According to such example embodiments, the timing advance related information is a data sequence, wherein the timing advance value is encoded in the data sequence. It should be appreciated that in cases where the timing advance related information is provided on the first carrier and is an indication that the timing advance value may be obtained on the second carrier, the obtaining of the timing advance value may be provided via a detecting and decoding of the data sequence described above.

Operation 38

The base station is further configured to align 38 a transmission, to the wireless device, of the communications on the second carrier on the predetermined frame structure of the first carrier with an offset based on the determined timing advance value. The processing unit 420 is configured to align the transmission, to the wireless device, of the communications on the second carrier on the predetermined frame structure of the first carrier with the offset based on the determined timing advance value. The aligning module 38A is configured to perform operation 38. Examples of such alignment is explained in relation to at least FIGS. 3-5.

Example Operation 40

According to some of the example embodiments, the aligning 38 further comprises aligning 40 the transmission of communications to the predefined frame structure of the first carrier with the offset according to a predetermined slot, symbol, basic time unit or absolute time, which is associated with the determined timing advance value. The processing unit 420 is configured to align the transmission of communications to the predefined frame structure of the first carrier with the offset according to the predetermined slot, symbol, basic time unit or absolute time which is associated with the determined timing advance value.

An example of an offset according to a predetermined slot is provided in FIG. 3. An example of an offset according to a predetermined symbol is provided in FIG. 4. An example of an offset according to a predetermined absolute time is provided in FIG. 5.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

It should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation.

The invention claimed is:

1. A method, in a wireless device, for dynamic synchronization of communications for the wireless device on a second carrier to a predefined frame structure on a first carrier, wherein the wireless device is configured to receive communications on the first and second carriers, the method comprising:
   receiving, from a base station, timing advance related information for communication alignment on the second carrier;
   determining a timing advance value based on the received timing advance related information; and
   aligning a receipt of the communications on the second carrier to the predefined frame structure of the first carrier with an offset based on the determined timing advance value, thereby synchronizing communications for the wireless device on the second carrier to the predefined frame structure on the first carrier to enable the wireless device on the second carrier to communicate on the first carrier,
   wherein the first carrier is configured for synchronous communications and the second carrier is configured for shared communications.

2. The method of claim 1, wherein the communications are Long Term Evolution, LTE, or Wideband Code Division Multiple Access, WCDMA, based communications, the predefined frame structure is an Orthogonal Frequency Division Multiplexing, OFDM, frame structure or a CDMA frame structure.

3. The method of claim 1, wherein the receiving further comprises receiving the timing advance related information on the first carrier.

4. The method of claim 3, wherein the determining further comprises determining the timing advance related information comprises the timing advance value.

5. The method of claim 3, wherein the timing advance related information is an indication to receive the timing advance value on the second carrier.

6. The method of claim 1, wherein the receiving further comprises receiving the timing advance related information on the second carrier.

7. The method of claim 5, wherein the determining further comprises detecting a data sequence on the second carrier and decoding the timing advance value from the detected data sequence.

8. The method of claim 1, wherein the aligning further comprises aligning the receipt of communications to the predefined frame structure of the first carrier with the offset according to a predetermined slot, symbol, basic time unit or absolute time, which is associated with the determined timing advance value.

9. A wireless device for dynamic synchronization of communications for the wireless device on a second carrier to a predefined frame structure on a first carrier, wherein the wireless device is configured to receive communications on the first and second carriers, the wireless device comprising:
   a receiving unit configured to receive, from a base station, timing advance related information for communication alignment on the second carrier;
   a processing circuit configured to determine a timing advance value based on the received timing advance related information; and
   the processing circuit further configured to align a receipt of the communications on the second carrier to the predefined frame structure of the first carrier with an offset based on the determined timing advance value, thereby synchronizing communications for the wireless device on the second carrier to the predefined frame structure on the first carrier to enable the wireless device on the second carrier to communicate on the first carrier, wherein the wireless device is configured to use the first carrier for synchronous communications and the second carrier for shared communications.

10. The wireless device of claim 9, wherein the communications are Long Term Evolution, LTE, or Wideband Code Division Multiple Access, WCDMA, based communications, the predefined frame structure is an Orthogonal Frequency Division Multiplexing, OFDM, frame structure or a CDMA frame structure.

11. The wireless device of claim 9, wherein the receiving unit is further configured to receive the timing advance related information on the first carrier.

12. The wireless device of claim 11, wherein the processing circuit is further configured to determine the timing advance related information comprises the timing advance value.

13. The wireless device of claim 11, wherein the timing advance related information is an indication to receive the timing advance value on the second carrier.

14. The wireless device of claim 9, wherein the receiving unit is further configured to receive the timing advance related information on the second carrier.

15. The wireless device of claim 13, wherein the processing circuit is further configured to detect a data sequence on the second carrier and decode the timing advance value from the detected data sequence.

16. The wireless device of claim 9, wherein the processing circuit is further configured to align the receipt of communications to the predefined frame structure of the first carrier with the offset according to a predetermined slot, symbol, basic time unit or absolute time, which is associated with the determined timing advance value.

17. A method, in a base station, for dynamic synchronization of communications for the wireless device on a second carrier to a predefined frame structure on a first carrier, wherein the wireless device is configured to receive communications on the first and second carriers, the method comprising:

identifying an availability of the second carrier;
determining a timing advance value for communication alignment on the second carrier;
sending, to the wireless device, timing advance related information; and
aligning a transmission, to the wireless device, of the communications on the second carrier on the predetermined frame structure of the first carrier with an offset based on the determined timing advance value, thereby synchronizing communications for the wireless device on the second carrier to the predefined frame structure on the first carrier to enable the wireless device on the second carrier to communicate on the first carrier
wherein the first carrier is configured for synchronous communications and the second carrier is configured for shared communications.

18. The method of claim 17, wherein the communications are Long Term Evolution, LTE, or Wideband Code Division Multiple Access, WCDMA, based communications, the predefined frame structure is an Orthogonal Frequency Division Multiplexing, OFDM, frame structure or a CDMA frame structure.

19. The method of claim 17, wherein the sending further comprises sending the timing advance related information on the first carrier.

20. The method of claim 19, wherein the timing advance related information comprises the timing advance value.

21. The method of claim 19, wherein the timing advance related information is an indication to receive the timing advance value on the second carrier.

22. The method of claim 17, wherein the sending further comprises sending the timing advance related information on the second carrier.

23. The method of claim 21, wherein the timing advance related information is a data sequence, wherein the timing advance value is encoded in the data sequence.

24. The method of claim 17, wherein the aligning further comprises aligning the transmission of communications to the predefined frame structure of the first carrier with the offset according to a predetermined slot, symbol, basic time unit or absolute time, which is associated with the determined timing advance value.

25. A base station for dynamic synchronization of communications for the wireless device on a second carrier to a predefined frame structure on a first carrier, wherein the wireless device is configured to receive communications on the first and second carriers, the base station comprising:
a processing circuit configured to identify an availability of the second carrier;
the processing circuit is further configured to determine a timing advance value for communication alignment on the second carrier;
a transmitting unit configured to transmit, to the wireless device, timing advance related information; and
the processing circuit is further configured to align a transmission, to the wireless device, of the communications on the second carrier on the predetermined frame structure of the first carrier with an offset based on the determined timing advance value, thereby synchronizing communications for the wireless device on the second carrier to the predefined frame structure on the first carrier to enable the wireless device on the second carrier to communicate on the first carrier, wherein the base station is configured to use the first carrier for synchronous communications and the second carrier for shared communications.

26. The base station of claim 25, wherein the communications are Long Term Evolution, LTE, or Wideband Code Division Multiple Access, WCDMA, based communications, the predefined frame structure is an Orthogonal Frequency Division Multiplexing, OFDM, frame structure or a CDMA frame structure.

27. The base station of claim 25, wherein the transmitting unit is further configured to transmit the timing advance related information on the first carrier.

28. The base station of claim 27, wherein the timing advance related information comprises the timing advance value.

29. The base station of claim 27, wherein the timing advance related information is an indication to receive the timing advance value on the second carrier.

30. The base station of claim 25, wherein the transmitting unit is further configured to transmit the timing advance related information on the second carrier.

31. The base station of claim 29, wherein the timing advance related information is a data sequence, wherein the timing advance value is encoded in the data sequence.

32. The base station of claim 25, wherein the processing circuit is further configured to align the transmission of communications to the predefined frame structure of the first carrier with the offset according to a predetermined slot, symbol, basic time unit or absolute time, which is associated with the determined timing advance value.

33. A wireless device for dynamic synchronization of communications for the wireless device on a second carrier to a predefined frame structure on a first carrier, wherein the wireless device is configured to receive communications on the first and second carriers, the wireless device comprising a processor and a memory, said memory comprising instructions executable by said processor whereby said wireless device is configured to:
receive, from a base station, timing advance related information for communication alignment on the second carrier;
determine a timing advance value based on the received timing advance related information; and
align a receipt of the communications on the second carrier to the predefined frame structure of the first carrier with an offset based on the determined timing advance value, thereby synchronizing communications for the wireless device on the second carrier to the predefined frame structure on the first carrier to enable the wireless device on the second carrier to communicate on the first carrier, wherein the wireless device is configured to use the first carrier for synchronous communications and the second carrier for shared communications.

34. A base station for dynamic synchronization of communications for the wireless device on a second carrier to a predefined frame structure on a first carrier, wherein the wireless device is configured to receive communications on the first and second carriers, the base station comprising a processor and a memory, said memory comprising instructions executable by said processor whereby said base station is configured to:
identify an availability of the second carrier;
determine a timing advance value for communication alignment on the second carrier;
send, to the wireless device, timing advance related information; and
align a transmission, to the wireless device, of the communications on the second carrier on the predetermined frame structure of the first carrier with an offset based on the determined timing advance value, thereby synchronizing communications for the wireless device on the second carrier to the predefined frame structure on the first carrier to enable the wireless device on the second carrier to communicate on the first carrier, wherein the base station is configured to use the first carrier for synchronous communications and the second carrier for shared communications.

* * * * *